United States Patent [19]

Fretwell et al.

[11] 3,781,817

[45] Dec. 25, 1973

[54] RESTRAINT SIGNAL GENERATOR AND OSCILLATOR

[75] Inventors: Richard D. Fretwell; James W. Azbell, both of Columbus; Edwin E. Mason, Harrisburg, all of Ohio

[73] Assignee: Design Elements, Inc., Columbus, Ohio

[22] Filed: Apr. 20, 1972

[21] Appl. No.: 245,769

[52] U.S. Cl. .......... 340/172.5
[51] Int. Cl. .......... G06f 5/06
[58] Field of Search .......... 340/172.5, 173; 338/108 C, 108 D

[56] References Cited

UNITED STATES PATENTS

| | | | |
|---|---|---|---|
| 3,680,055 | 7/1972 | Wilson | 340/172.5 |
| 3,671,881 | 6/1972 | Yorganjian | 331/108 D X |
| 3,659,224 | 4/1972 | Ball | 331/108 C X |
| 2,817,072 | 12/1957 | Chien | 340/172.5 X |
| 2,907,004 | 9/1959 | Chien | 340/172.5 X |
| 3,012,230 | 12/1961 | Galas | 340/172.5 |
| 3,302,185 | 1/1967 | Cox | 340/172.5 |

*Primary Examiner*—Gareth D. Shaw
*Assistant Examiner*—Sydney R. Chirlin
*Attorney*—Anthony D. Cennamo et al.

[57] ABSTRACT

A circuit for use with a data terminal, including a data modulator and a buffer, for generating a signal which restrains the transmission of incoming data when the buffer is full. The generator has a square wave oscillator comprising a high gain differential comparator with a resistive feedback network connected to its non-inverting input and a series pair of resistors connected between its output and its inverting input. A capacitance is connected between the common node of the series pair and a dc supply. The oscillator is inhibited by a dc signal applied through a diode to the comparator's inverting input when the buffer is not full but is effectively freed to oscillate when the buffer is full to apply a modulating restraint signal input to the modem's modulator.

7 Claims, 2 Drawing Figures

RESTRAINT SIGNAL GENERATOR AND OSCILLATOR

BACKGROUND OF THE INVENTION

This invention relates generally to data terminal apparatus and more particularly relates to a circuit for at times restraining the transmission of incoming data to a terminal.

Computer data and other communications are often transmitted over telephone lines, micro-wave links, or other systems by means of frequency shift modulation. The data bits are transmitted in the form of mark and space pulses, the mark being designated by one frequency, the space being designated by another. Data pulses both to and from a terminal are demodulated and modulated respectively by a modem. An input-output typewriter, computer storage device or other machine is connected to the modem for receiving the modulated incoming data and for sending outgoing data.

An advanced modem is capable of sending and receiving simultaneously over two different channels. Conventionally, when the modem of one terminal is receiving data from a remote terminal over one channel it is simultaneously transmitting a continuous mark frequency over the other channel. For example, it may be transmitting a continuous sine wave at 1,270 Hz or 2,225 Hz.

Data is often transmitted into a terminal at a rate faster than the terminal can process the data. For example, the data transmission rate may significantly exceed the printout rate of the typewriter. Consequently, a buffer must be provided for accumulating the excess data. However, when the buffer itself is filled with data, incoming transmission must cease or further incoming data will be lost.

Traditionally, the data transmitting terminal is instructed to stop sending data by the receiving terminal beginning to modulate its continuously transmitted mark frequency. The mark frequency may be alternately shifted 50 Hz down and returned at a 50 Hz rate. For example, if the terminal receiving data is continuously transmitting a mark at 1,270 Hz and its buffer becomes filled, it should begin shifting its outgoing frequency between 1,270 Hz and 1,220 Hz at a 50 cycle rate. Upon receiving this instruction, the data transmitting terminal will cease sending data to the receiving terminal and will either wait until the 50 cycle modulation ceases or, in a multiplexing operation, will transmit data to another terminal until the buffer of the receiving terminal is cleared.

There is therefore a need for a simple, effective, and inexpensive circuit for generating the restraint signal in response to the filling of the terminal buffer.

SUMMARY OF THE INVENTION

The invention has a square wave oscillator comprising a high gain differential comparator having a first voltage divider feedback network connected to its output, to a common ground and to one of its inputs and a second feedback network including a series connected pair of resistors connected between the output and the other of the inputs. A capacitance is connected between the common node of the resistor pair and to an ac ground.

The oscillator is used in a restraint signal generator by connecting it with an electronic switching means which is effectively connected to a "full" signalling means on a buffer for control thereby. The switching means is connected to one of the comparator circuit inputs and to a fixed dc voltage level for applying a selected dc voltage level to one of the inputs when the buffer is not full for inhibiting its operation and for effectively freeing the oscillator to oscillate when the buffer is full.

It is an object of this invention to provide an improved restraint generator.

A further object of the invention is to provide a restraint generator of improved simplicity cost and operability.

Further objects and features of the invention will be apparent from the following specification and claims when considered in connection with the accompanying drawings illustrating the preferred embodiment of the invention.

Figure 1:
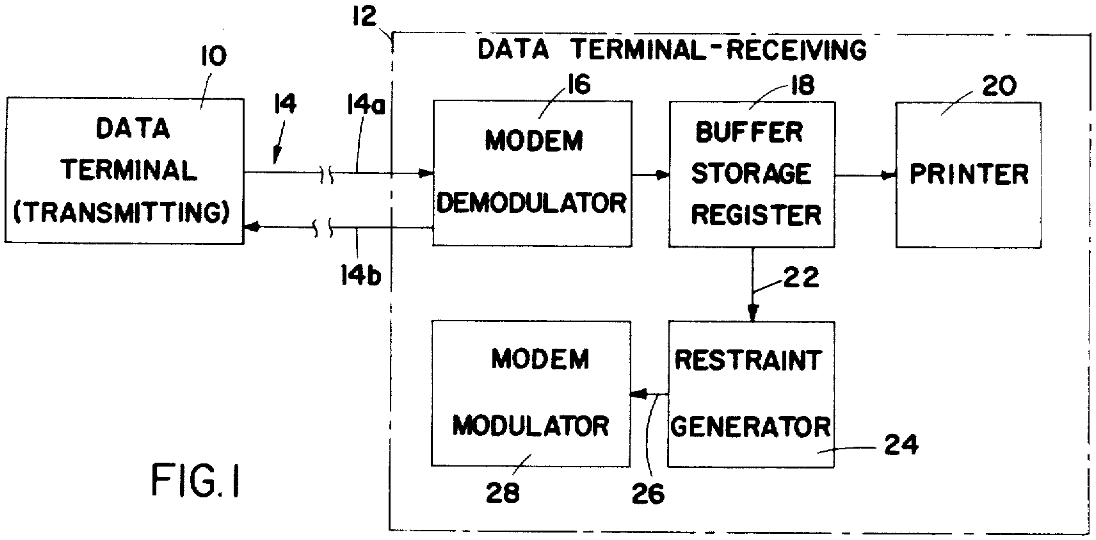
FIG. 1 is a block diagram illustrating the connection of a restraint generator according to the invention in a data terminal.

In describing the preferred embodiment of the invention illustrated in the drawings, specific terminology will be resorted to for the sake of clarity. However, it is not intended to be limited to the specific terms so selected and it is to be understood that each specific term includes all technical equivalents which operate in a similar manner to accomplish a similar purpose. For example, the terms "connection" or "effective connection" are not to be limited to direct connection where the interposition of other elements would be known to those skill in the art.

DETAILED DESCRIPTION

FIG. 1 illustrates a first data terminal 10 at a remote location which is transmitting data to a second data terminal 12 over a transmission line 14. The incoming data is represented at **14*a***.

Such incoming data is applied to a modem 16 which, among other things, demodulates the data and sends it to a buffer 18. The buffer 18, in turn, shifts the data to a printer 20 or to a storage or other machine. The buffer 18 is a storage register which shifts data to the printer 20 at a rate which the printer can accept while receiving data from the modem at the rate it is transmitted.

The buffer 18 accumulates transmitted data which is in excess of that processed by the printer. When the storage register of the buffer 18 is full it applies a "full" signal through a signalling means 22 to a restraint generator 24.

The restraint generator 24 upon receipt of the "full" signal at 22 from the buffer 18 generates a 50 Hz square wave to 26 which is applied to the modem modulator 28. In response to the 50 Hz square wave, the modem modulator shifts its output frequency between the channel mark frequency and a frequency spaced 50 Hz lower at a 50 Hz rate. This modulator output is applied as indicated at **14*b* to the remote data terminal 10. The data terminal 10 will then cease transmitting incoming data 14*a* until the 50 Hz modulation at 14*b*** ceases.

Figure 2:
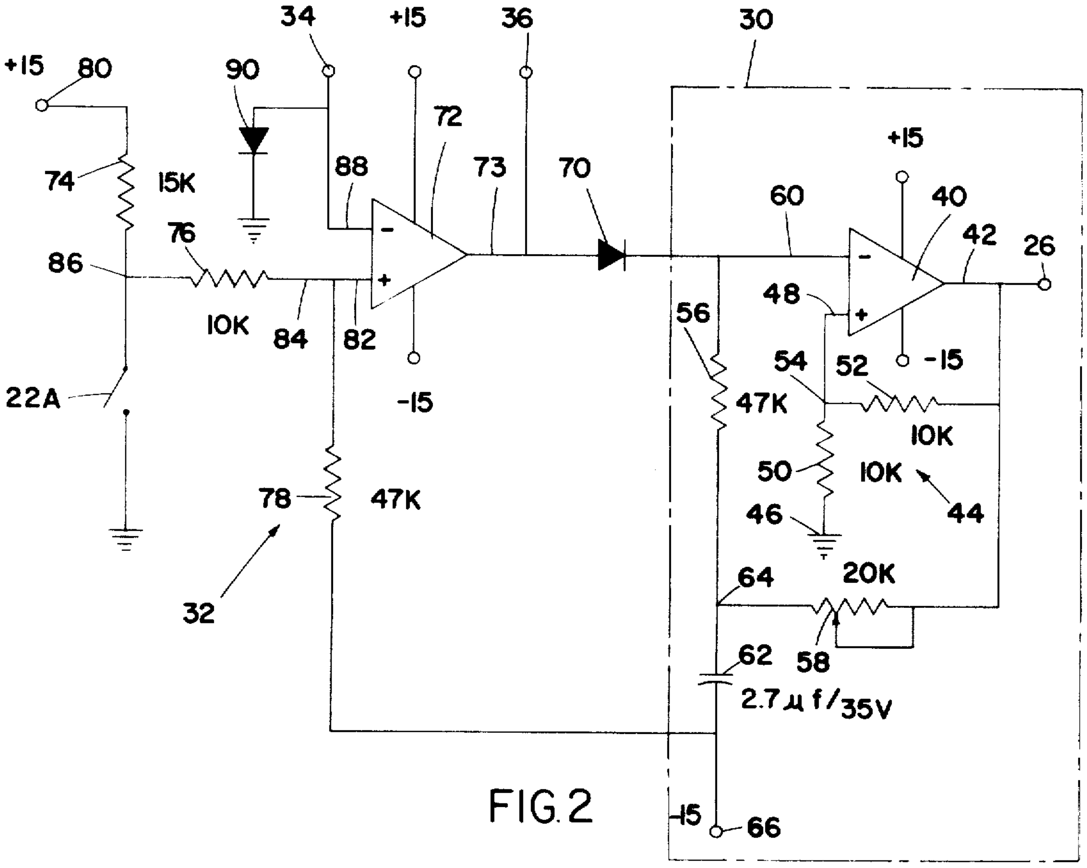
FIG. 2 is a schematic diagram of the preferred restraint generator embodying the invention.

FIG. 2 illustrates the preferred restraint generator embodying the invention and having its output 26. The input from the buffer carrying the "full" signal 22 is illustrated in the preferred embodiment as a switch 22a which closes when the buffer 18 is filled.

The circuit illustrated in FIG. 2 comprises two main parts. It has an oscillator 30 for generating a square wave at a 50 Hz rate shifting between a +15 volt level and a −15 volt level. The remainder of the circuit, except for the contacts of switch 22A, comprises an electronic switching means for inhibiting the operation of the oscillator 30 when the buffer 18 is not filled and for freeing the oscillator to permit oscillation when the buffer is "full." Input terminals 34 and 36 are available for connection to the modem to inhibit the operation of the entire restraint circuit by either a negative voltage applied at the terminal 34 or a positive voltage applied at the terminal 36 from another part of the modem circuit.

The square wave oscillator 30 has a high gain, differential comparator 40 with its output 42 connected to the output 26 of the restraint generator 24. A first voltage divider feedback network 44 is connected to the comparator output 42, to a common ground 46 and to the non-inverting input 48 of the comparator 44. This first feedback network 44 comprises a pair of substantially equal resistances 50 and 52 which are connected between the comparator output 42 and the common ground 46. The common node 54 of the voltage divider formed by the resistances 50 and 52 is connected to the non-inverting input 48 of the comparator 40. The first feedback network 44 applies a proportion of the signal at the comparator output 42 to the non-inverting input 48.

The oscillator 30 also has a second feedback network including a series connected pair of resistances 56 and 58 connected between the comparator output 40 and the non-inverting input 60 of the comparator 40. A capacitance 62 is connected between the common node 64 of the resistance pair and through a −15 volt dc source connected at terminal 66 to an ac ground namely to the common ground 46.

The switch contacts 22a represent the contacts which are closed by the buffer when its storage register is full of excess data. This switch is in effect a signalling means for signalling that the buffer is full. Connected between the switch 22a and the inverting input 60 of the comparator 40 is an electronic switching means indicated generally as 32. This switching means applies a selected ac voltage level; for example +15 volts, to the inverting input 60 whenever the switch 22a is open because the buffer is not full. The presence of this fixed dc voltage at the inverting input 60 inhibits operation of the oscillator to prevent generation of the restraint signal. However, when the switch 22a closed because the buffer has become full, a negative voltage, for example −15 volts, is applied to the anode of the diode 70 which effectively disconnects the switching means 32 from the inverting input 60 to free the oscillator to oscillate and generate the restraint signal.

This electronic switching means 32 comprises a second high gain differential comparator 72 having its output 73 connected through the diode 70 to the inverting input 60 of the oscillator comparator 40. An input terminal 35 is also provided at the input anode of the diode 70 to permit inhibiting of the oscillator by the circuitry external to the restraint generator illustrated in FIG. 2.

Three voltage dividing resistors 74, 76, and 78 are connected between a +15 volt supply at terminal 80 in a −15 volts supply at terminal 66. The non-inverting input 82 of the comparator 72 is connected at one node 84 of these three voltages dividing resistances 74, 76, and 78 and the signallig contacts 22a are connected between its other node 86 and ground. The inverting input 88 of the comparator 72 is connected to a terminal 34 permitting the restraint generator to be inhibited by a negative voltage applied from circuitry external to the restraint generator illustrated in FIG. 2.

The operation of the restraint generator illustrated in FIG. 2 may be considered initially by assuming that the switch 22a is open and that the output of the comparator 72 is at a +15 volt level. In this condition, the diode 70 is forward biased to hold the inverting input 60 of the oscillator comparator 40 at +15 volts. The oscillator 30 cannot oscillate. The voltage dividing resistors 50 and 52 are of equal value so that if the output of the comparator is at a −15 volt level then a dc will be applied to the non-inverting input 48 at a −7.5 volt level. A −15 volt level at the output 42 of the comparator 40 is consistent with the presence of a −7.5 v at the non-inverting input 48 and a +15 volt level at the inverting input 60.

The node 64 at one side of the capacitance 62 will be at a negative voltage determined by the relative resistances of the voltage divider formed by the resistances 56 and 58. The node 64 will be sitting at a negative voltage less negative than −15 volts.

If now a −15 volts is applied to the anode of the diode 70 because the buffer 18 is full and the switch 22a closed, then the entire electronic switching means 32 will be disconnected effectively from the oscillator 30 by the diode 70.

If the node 64 was at a voltage more negative than −7.5 volts, because the resistance 58 was sufficiently small, then the output 42 will immediately switch to a +15 volt level. If, however, the node 64 is at a voltage less negative then −7.5 volts, the capacitor 62 will immediately begin to discharge until its node 64 is more negative than −7.5 volts, at which time the comparator 40 will switch and its output will then go to +15 volts. In either case, the output level will shift to a +15 volts either immediately after or shortly after the diode 70 disconnects the oscillator and frees it for oscillation.

The voltage divider 44 will then apply a +7.5 volts to the non-inverting input 48. Additionally, capacitor 62 will begin charging with the node 64, and consequently, the inverting input 60, moving toward the +15 volt level. When the node 64, and consequently the inverting input 60, charge past the +7.5 volt level, the comparator will again shift so that its output 42 will shift to a −15 volt level.

This, of course, means that the input to the non-inverting input 48 will suddenly become a −7.5 volts. The node 64 which was at a +7.5 volt level when this switching occurred, will now move toward a −7.5 volt level as the capacitance 62 discharges. Again, when the node 64 has decayed through −7.5 volts, the output 42 of the comparator 40 will again shift to a +15 volt level and the above oscillations will continue. The node 64 will oscillate between −7.5 volts and +7.5 volts in a triangular waveform. The time between shifts in the output 42 will be determined by the time constant provided by the resistance 58 and the capacitance 62.

When the buffer 18 has emptied, because the generated restraint signal has instructed the transmitting terminal to cease transmitting, the switch 22*a* will open so that the non-inverting input 82 to the comparator 72 can go to a voltage level determined by the resistances 74, 76, and 78. From the preferred values indicated on the drawings, this will cause the non-inverting input 82 to go to approximately a +5 volt level. Because diode 90 prevents the application of a positive voltage to the inverting input 88 of the comparator 72, this will assure that a positive 15 volts is applied to the diode 70 to inhibit the oscillations of the oscillator 30 by clamping the inverting input 60 of the comparator 40 to a +15 volt leve.

When the buffer again comes full, the switch 22*a* closes connecting the node 86 to ground so that the node 84 and consequently the non-inverting input 82 of the comparator 72 will be connected to a negative voltage level which will cause the output of the comparator 72 to become a −15 volt level. This reverse biases the diode 70 and disconnects and frees the oscillator for oscillation. However, the effect of the −15 volts applied at the non-inverting input 82 can be overridden by the application of a −15 volts at the input terminal 32 to maintain the oscillator 30 in an inhibited condition.

It is to be understood that while the detailed drawings and specific examples given describe preferred embodiments of the invention, they are for the purposes of illustration only, that the apparatus of the invention is not limited to the precise details and conditions disclosed and that various changes may be made therein without departing from the spirit of the invention which is defined by the following claims.

I claim:

1. A restraint signal generator for use with a data terminal including a data modulator and a buffer, the buffer having a "full" signalling means, the generator comprising:

a. a square oscillator including a high gain differential comparator cirucit having an inverting input, a non-inverting, and an output, said output connected to said modulator for modulating the signal at said output;

b. electronic switching means effectively connected (I) to said "full" signalling means for control thereby (II) to one of said comparator circuit inputs (III) to a fixed dc voltage for applying a selected dc voltage level to one of said inputs to inhibit said oscillator when said buffer is not full and for effectively disconnecting said voltage level when said buffer is full freeing said oscillator to oscillate;

c. a second high gain differential comparator having its output connected to said switching means, its non-inverting input effectively connected to said signalling means, and its inverting input connected to a restraint inhibiting logic circuit of said modem;

d. at least three series connected voltage dividing resistances connected between a positive dc source and a negative dc source, having the non-inverting input of said second comparator connected to one node of said series dividing resistances; and e. a second switching means connected between another node of said series voltage dividing resistances and a dc level intermediate said sources, said second switching means comprising a pair of contacts which are closed by said buffer when the buffer is full.

2. A generator according to claim 1 wherein a variable resistance is connected between said common node and said output for controlling the oscillator frequency.

3. A generator according to claim 1 wherein said first feedback network comprises a pair of substantially equal resistances connected between said output and said common ground and said non-inverting input is connected to their common node.

4. A generator according to claim 1 wherein said first feedback network is connected to said non-inverting input.

5. A generator according to claim 1 wherein said switching means comprises a diode.

6. A generator according to claim 1 wherein said diode and said second feedback network are connected to said inverting input.

7. A generator according to claim 1 wherein said capacitor is connected through a dc source to said common ground.

* * * * *